Nov. 17, 1925.
F. L. MORSE
1,561,944
CHAIN GEAR TRANSMISSION
Filed Jan. 10, 1920   2 Sheets-Sheet 1
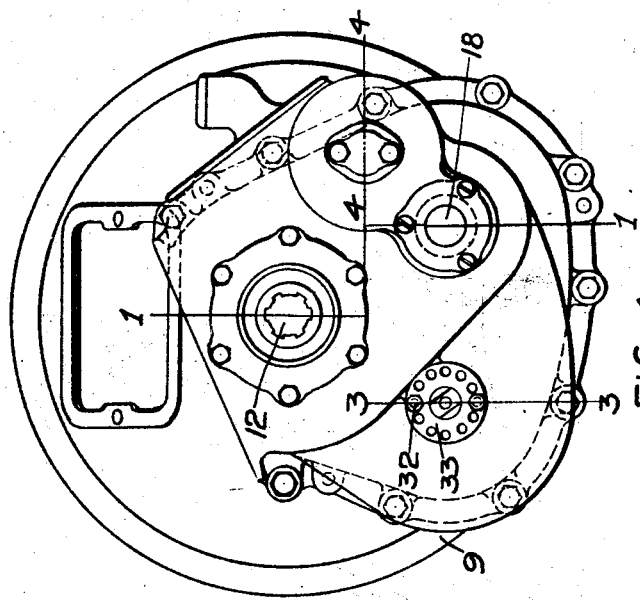
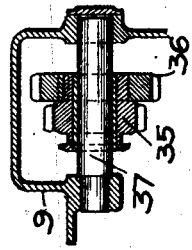
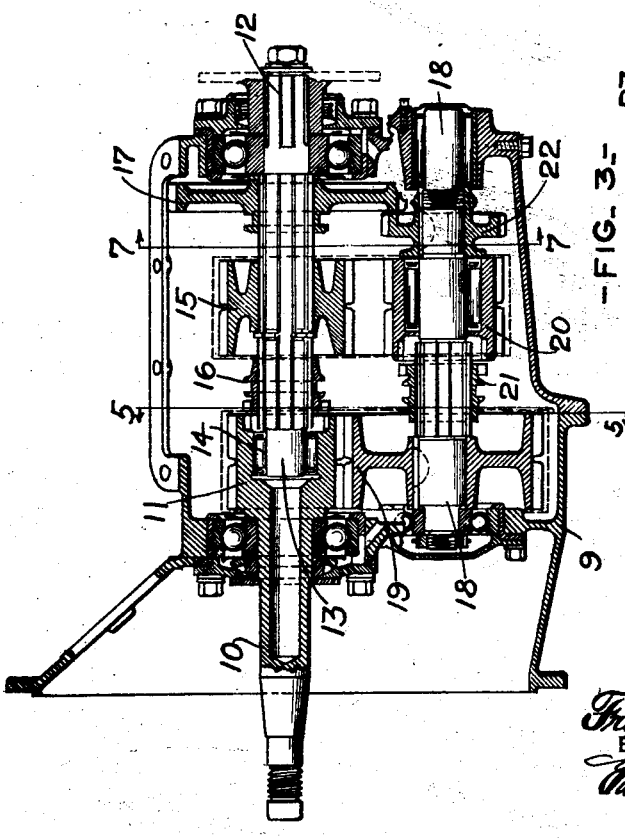
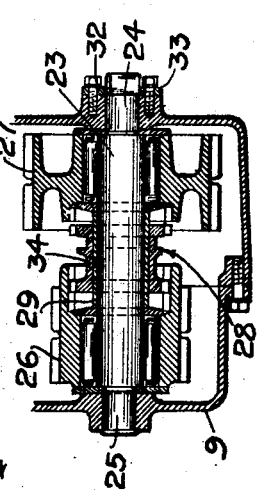
INVENTOR
Frank L. Morse.
BY
Edward H. Wright
ATTORNEY

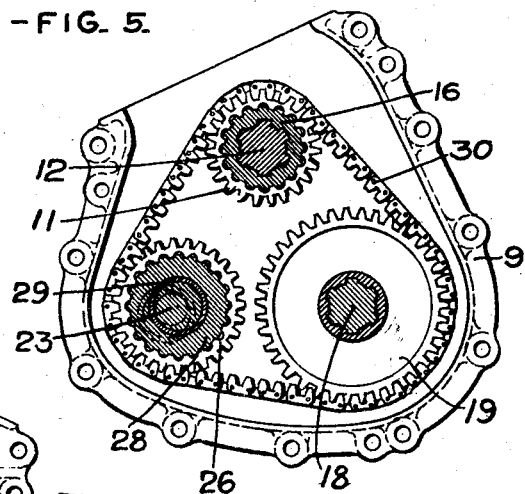
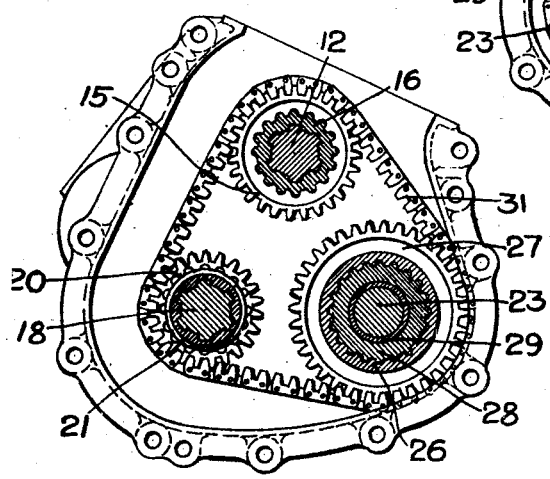
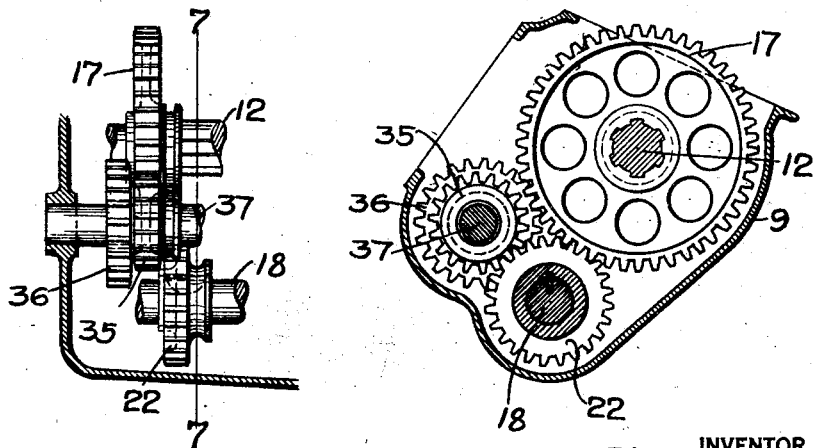

Patented Nov. 17, 1925.

1,561,944

UNITED STATES PATENT OFFICE.

FRANK L. MORSE, OF ITHACA, NEW YORK.

CHAIN-GEAR TRANSMISSION.

Application filed January 10, 1920. Serial No. 350,502.

*To all whom it may concern:*

Be it known that I, FRANK L. MORSE, a citizen of the United States, residing at Ithaca, in the county of Tompkins and State of New York, have invented a certain new and useful Improvement in Chain-Gear Transmissions, of which improvement the following is a specification.

This invention relates to change speed gear mechanism for automobiles and the like, and has for its object to provide a mechanism of this character in which chains operating upon sprocket wheels are employed in lieu of intermeshing spur gear wheels, the desired variations in speed being obtained by employing the proper relation of sizes of sprocket wheels. A plurality of shafts, preferably three, are employed, each carrying sprocket wheels upon which the chains operate, two of the shafts being mounted in fixed bearings in the frame or casing, while a third or other shaft is adjustably mounted to provide for taking up the wear and slack in the drive chains. One of the features of my invention comprises an improved means for adjusting the movable shaft for this purpose.

In the ordinary form of transmission gear, the high speed is obtained by connecting the engine shaft by a clutch directly to the propelling shaft, and the engine is then run at the usual high rate of speed at which it is desired to propel the car. With the engine running at this high rate of speed, there is considerable vibration and noise, which is more or less objectionable. According to one of the features of my invention, there is provided a higher or step-up speed to drive the propelling shaft through the chain gearing at a higher rate of speed than the engine shaft. This not only makes it possible to drive the vehicle faster, but provides for the usual rate of driving with the engine running at a lower speed, thereby reducing the vibration. The chain drive being practically silent does not produce objectionable noise, even at the highest speed.

According to another feature of my improvement, one of the shafts, preferably the one employed for adjusting the slack of the chain, is mounted in a normally fixed position in the casing and carries two or more sprocket gear wheels rotatably mounted on the shaft with a clutch means for connecting or disconnecting said sprockets. The shaft is preferably provided with cylindrical end portions eccentric to the shaft, and mounted in the casing with means for adjusting the shaft by a partial rotary movement, and means for rigidly securing said shaft in any one of the positions to which it may be adjusted.

Another feature of my improvement comprises a gear connection between two shafts wherein one gear wheel may slide longitudinally of its shaft, either into or out of mesh with the other gear for the reverse transmission, and another intermediate gear on another shaft adapted to slide into mesh with both of said first and second gears for producing the low speed forward.

In the accompanying drawing: Figure 1 is a vrtical longitudinal section of a gear box and gearing, embodying my improvement, and taken substantially on the line 1—1 of Fig. 2; Fig. 2, an end elevation; Fig. 3, a section of one of the shafts and sprocket gears thereon, taken on the line 3—3 of Fig. 2; Fig. 4, a horizontal sectional view of the intermediate shaft and double gear, taken substantially on the line 4—4 of Fig. 2; Fig. 5, a transverse section taken on the line 5—5 of Fig. 1, in the direction of the arrow; Fig. 6, a sectional view in the same plane but looking in the opposite direction; Fig. 7, a transverse section taken on the line 7—7 of Figs. 1 and 8; and Fig. 8, an elevation of the reversing and low speed gearing illustrated in Fig. 7.

According to the construction shown, 9 indicates the gear box or casing, in which is mounted the power shaft, 10, adapted to be driven by the engine or motor in the usual way, and carrying the sprocket gear wheel, 11. The driven shaft, 12, which extends out at the rear of the casing for propelling the vehicle, or for other purposes, is preferably mounted in the same longitudinal axis with the power shaft, 10, so that when these two shafts are clutched together for a direct drive, both turn together as one integral shaft. The shafts may be mounted in the casing by the usual ball or roller bearings, and the forward end of the shaft, 12, has a cylindrical portion, 13, extending within a socket in the hub of the sprocket wheel, 11, and adapted to turn therein upon the roller bearing, 14. The shaft, 12, carries the sprocket gear, 15, fixed to turn with the shaft, and a spur gear, 17, mounted to slide longitudinally and also to turn with said shaft. A clutch member, 16, is also slidably mounted on said shaft, 12, to turn therewith, and is adapted to engage with a corresponding clutch surface formed on the sprocket wheel, 11, when the two shafts, 10 and 12, are clutched together, or to be released therefrom when it is desired that said shafts, 10 and 12, may rotate independently of each other.

Another shaft, 18, termed a lay shaft, is suitably mounted in the casing parallel to shaft, 12, and carries sprocket gear, 19, keyed on said shaft, 18, in the same transverse plane with the sprocket wheel, 11, on the power shaft. The shaft, 18, also carries fixed spur gear, 22, and a sprocket gear, 20, loosely mounted on the shaft in a plane with sprocket wheel, 15, the clutch, 21, being slidably mounted to turn with the shaft, and adapted to engage the wheel, 20, for clutching the same to turn with the shaft in one position, and for disconnecting the same from the shaft in its other position.

According to one of the features of my improvement, an additional sprocket wheel is provided for each of the drive chains, 30 and 31, operating on the sprocket gears, 14—19 and 15—20, respectively, and said additional sprocket wheels are mounted so as to be adjustable laterally in order to take up the wear and slack in the chains. These additional sprocket wheels, 26 and 27, are shown particularly in Fig. 3, the former being in a plane with wheels, 14 and 19, and the latter in a plane with wheels, 15 and 20. While various means may be provided for adjusting the additional sprocket wheels, according to a preferred construction, they may be loosely mounted on roller bearings on a normally fixed or stationary shaft, 23, the shaft being supported in the casing by means of cylindrical end portions, 24 and 25, formed eccentrically with reference to said shaft. By applying a wrench to the squared end of the shaft projecting from the casing, it may be turned to the desired position to properly adjust the slack in the drive chains, the shaft being held in any position to which it is adjusted by means of bolts, 32, extending through holes in the plate, 33, which holds the shaft against rotation. The extreme adjustment of the shaft is indicated in dotted lines in Fig. 5.

In order that the sprocket wheels, 26 and 27, may also be utilized to determine one of the speeds of the driven shaft of the transmission mechanism, a clutch device is employed for connecting and disconnecting said additional sprocket wheels. According to a preferred construction, the sprocket wheels may be held spaced apart by means of a bushing or sleeve, 29, mounted on the shaft, 23, and secured by a set screw, 34, while a clutch member, 28, is rotatably mounted on said sleeve, and is adapted to slide longitudinally to connect and disconnect said wheels.

The spur gear wheels, 17 and 22, normally occupy the relative positions indicated in Fig. 1, that is, out of mesh with each other, but the gear, 17, is adapted to be shifted longitudinally upon its shaft to mesh with gear 22, and thereby effect the reverse drive for the shaft, 12.

According to another feature of my invention, an additional forward driving speed is introduced into the mechanism by inserting a small intermediate gear between the gears, 17 and 22, and adapted to be shifted to one position for engaging or meshing with both of said gears, and to another position for disconnecting the same. This additional gear is preferably of double width, or composed of two gears, 35, and 36, rigidly attached together and mounted to rotate upon a short shaft, 37, supported in the casing. The gears may be of the same or different diameters, and are adapted to be shifted longitudinally upon said shaft to a position in which gear 35 meshes with gear 22, and gear 36 meshes with gear 17, for producing a forward drive, preferably at the lowest speed.

The sprocket wheels and spur gears are made of the proper size and number of teeth to give the desired speed for which they are designed, and the clutches, and also the gears, 17, 35, and 36, are adapted to be shifted into and out of mesh by means of the usual manually operated control levers for changing the speed, as will be readily understood.

When the clutches are all released, and the gears, 17 and 22, disconnected, the power shaft, 10, drives the sprocket wheel, 11, and through the chain, 30, the sprocket wheels, 19 and 26. The wheel, 19, turns the shaft, 18, while the wheel, 26, runs loosely on the fixed shaft, 23. The shaft, 18 turns loosely within the sprocket wheel, 20, without rotating the same, so there is no effect to turn the wheel, 15; and the shaft, 12, remains stationary, the wheel, 11, turning upon the roller bearing, 14, at the forward end of the shaft, 12.

To throw in the lowest or first speed, the gear, 35—36, is shifted into engagement with gear wheels, 22 and 17, respectively, whereby the shaft, 18, transmits motion through these gears to the driven shaft, 12, and turns the same at the desired low speed. During this movement, the sprocket wheel, 15, operates the chain, 31, but this has no effect except to turn the sprocket wheels, 20 and 27, loosely upon their respective shafts. To throw in the next higher or second speed, the gear, 35—36, is shifted back to its first position, and the clutch, 21, is thrown in, thereby connecting the sprocket wheel, 20, to the shaft, 18, and driving through chain, 31, and sprocket wheel, 15, to the shaft, 12. For the third speed, the clutch, 21, is thrown out and the clutch, 16, is shifted to engage the sprocket gear, 11, thereby connecting the shaft, 12, directly to the power shaft, 10. At this time, the sprocket chains turn the wheels, 20, 26 and 27, loosely upon their shafts, and the gears, 22 and 17, also turn with their shafts, but have no effect. For the fourth or highest speed, the clutch 16, is released, and the clutch, 28, is thrown to connect the sprocket wheels, 26 and 27, together. The power is then transmitted from sprocket gear, 11, through chain, 30, sprocket gears, 26 and 27, chain, 31, and sprocket gear, 15, to the driven shaft, 12, thereby revolving the same at a higher speed than the power shaft, 10, as the ratio of the gearing is designed for this purpose. In order to reverse the direction of rotation of the shaft, 12, the gear, 17, is shifted to mesh directly with gear, 22, whereupon the power is transmitted through chain, 30, sprocket wheel, 19, shaft, 18, and gears, 22 and 17, to the shaft, 12, thereby producing the reverse.

Among the advantages derived from my improvement embodying the use of sprocket wheels and drive chains with a step-up speed greater than a direct connection between the power shaft and the driven shaft, is that the vehicle, or mechanism operated by the driven shaft, may be run at the customary high speed, while the engine or motor is operating at a lower speed than usual, thereby greatly reducing the noise and vibration, as well as the wear of the motor, while at the same time producing a silent running mechanism on account of the use of the drive chains instead of spur gears.

Another advantage is that by using the additional adjustable sprocket wheels for taking up the wear and slack of the chains, the spur gears for producing the reverse may be mounted directly upon the driven shaft and the lay shaft which also carry the sprocket wheels for one or more of the forward speeds, as these shafts are mounted in bearings with fixed centers.

Having now described my invention, what I claim as new and desire to secure by Letters Patent is:

1. In a transmission mechanism, the combination of a power shaft having a sprocket gear, a driven shaft also having a sprocket gear, a lay shaft having corresponding sprocket gears, drive chains for said sprocket gears, a clutch device for one of said sprocket gears, another normally fixed shaft having additional sprocket gears loosely mounted thereon, a bushing on said shaft for separating said sprockets, and a clutch device rotatably mounted on said bushing for connecting said additional sprockets together.

2. In a transmission mechanism, the combination of a power shaft having a sprocket gear, a driven shaft also having a sprocket gear, a lay shaft having corresponding gear, a lay shaft having corresponding sprocket gears, drive chains for said sprocket gears, a clutch device for one of said gears, a spur gear on the lay shaft, sprocket gears, a spur gear on the lay shaft, a spur gear on the driven shaft adapted to mesh therewith for reversing, and means for engaging and disengaging said gears.

3. In a transmission mechanism, the combination of a power shaft having a sprocket gear, a driven shaft also having a sprocket gear, a lay shaft having corresponding sprocket gears, drive chains for said sprocket gears, a clutch device for one of said sprocket gears, a spur gear on the lay shaft, a corresponding gear for reverse on the driven shaft, and an intermediate gear adapted to mesh with both of said spur gears for a forward drive.

4. In a transmission mechanism, the combination of a powershaft having a sprocket gear, a driven shaft also having a sprocket gear, a lay shaft having corresponding sprocket gears, drive chains for said sprocket gears, a clutch device for one of said sprocket gears, a spur gear fixed on the lay shaft, a corresponding spur gear mounted to slide upon the driven shaft, and an intermediate gear adapted to be shifted longitudinally into mesh with both of said spur gears.

5. In a transmission mechanism, the combination of a power shaft having a sprocket gear, a driven shaft also having a sprocket gear, a lay shaft having corresponding gear, a lay shaft having corresponding sprocket gears, drive chains for said sprocket gears, a clutch device for one of sprocket gears, a spur gear fixed on said sprocket gears, another spur gear mounted on the lay shaft, another spur gear mounted on the driven shaft, another shaft, and a double faced spur gear slidably mounted thereon and adapted to mesh with the other two spur gears.

6. In a power transmission assembly the combination of a driving shaft, a driven shaft, gears mounted on said shafts, a normally fixed lay shaft having corresponding gears mounted thereon, chains connecting the corresponding gears on the different shafts, means for bringing the gears on the lay shaft into and out of driving connection, said lay shaft having eccentric bearings upon which it may be turned to shift the axis of rotation of the gears mounted thereon.

7. In a power transmission assembly the combination of a driving shaft, a driven shaft, gears mounted on said shafts, a normally fixed lay shaft having corresponding gears mounted thereon, chains connecting the corresponding gears on the different shafts, clutch means for connecting the gears on said lay shaft so that power may be transmitted therethrough and means for adjusting said last mentioned gears to take up slack in the chain.

8. In a power transmission assembly a gear casing, a driving shaft, a driven shaft, gears mounted on each of said shafts, a lay shaft having corresponding gears mounted thereon, means for bringing the gears on the said lay shaft into and out of driving connection, another lay shaft having corresponding gears mounted thereon, means for bringing the said gears into and out of driving connection, said lay shafts having bearings at each end in said casing and chain connecting the corresponding gears.

9. In a power transmission assembly a gear casing, a driving shaft, a driven shaft, gears mounted on each of said shafts, a normally fixed lay shaft having corresponding gears revolubly mounted thereon, means for bringing the gears on the said lay shaft into and out of driving connection, another lay shaft having corresponding gears mounted thereon, one of said gears being fixed to the shaft and the other revoluble thereon, means for bringing the said gears into and out of driving connection, said lay shafts having bearings at each end in said casing and chains connecting the corresponding gears.

In testimony whereof I have hereunto set my hand.

FRANK L. MORSE.